United States Patent [19]
Colclough et al.

[11] 3,876,733

[45] Apr. 8, 1975

[54] PROCESS FOR PREPARING PHOSPHOROTHIONYL DISULPHIDES

[75] Inventors: Terence Colclough, Wantage, England; Brian Hamilton, Haverfordwest, Wales

[73] Assignee: Exxon Research and Engineering Company, Linden, N.J.

[22] Filed: Oct. 1, 1973

[21] Appl. No.: 402,610

[30] Foreign Application Priority Data
Oct. 6, 1972 United Kingdom............... 46224/72

[52] U.S. Cl. ................ 260/985; 44/76; 44/DIG. 4; 252/46.6; 260/45.7 PS; 260/398.5; 260/926
[51] Int. Cl......... C07f 9/16; A01n 5/00; C10m 1/48
[58] Field of Search........................... 260/985, 926

[56] References Cited
UNITED STATES PATENTS
2,983,644   5/1961   Willard et al.................. 260/926 X

*Primary Examiner*—Anton H. Sutto
*Attorney, Agent, or Firm*—Frank T. Johmann

[57] ABSTRACT

Phosphorothionyl disulphides are prepared by reacting an organic thiophosphoric acid with hydrogen peroxide under conditions such that either the thiophosphoric acid is added to the hydrogen peroxide or the thiophosphoric acid and hydrogen peroxide are introduced into the reaction vessel such that there is never more than 10 mole % excess of thiophosphoric acid (compared with the hydrogen peroxide) added to the reaction vessel. In this manner phosphorothionyl disulphides which are useful as ashless lubricating oil antioxidants and anti-wear additives, can be prepared in good yield and with very low acid number.

7 Claims, No Drawings

PROCESS FOR PREPARING PHOSPHOROTHIONYL DISULPHIDES

This invention relates to a process for the preparation of phosphorothionyl disulphides.

Phosphorothionyl disulphides are useful as ashless lubricating oil additives where they function as good antioxidant, antiwear and extreme pressure additives. They are also useful as antioxidants in rubbers and plastics and as fuel oil and gasoline additives.

It has been proposed to prepare phosphorothionyl disulphides by the oxidation of a dithiophosphoric acid and in one method hydrogen peroxide is added slowly drop by drop to a dithiophosphoric acid cooled to a temperature of 0° C. When carrying out this method, i.e. the addition of hydrogen peroxide slowly to the dithiophosphoric acid, it has been found that an impure product with a high acid number is obtained consistently, and also under plant conditions low temperature operations present difficulties.

Surprisingly we have found that still using hydrogen peroxide a product in greater yield and purity with very low acid number can be obtained.

According to this invention a phosphorothionyl disulphide is prepared by a process wherein an organic thiophosphoric acid is reacted with hydrogen peroxide under conditions such that either the thiophosphoric acid is added to the hydrogen peroxide or the thiophosphoric acid and hydrogen peroxide are introduced into the reaction vessel such that there is never more than 10 mole % excess of thiophosphoric acid (compared with the hydrogen peroxide) added to the reaction vessel. It is an advantage of this process that the reaction may be carried out satisfactorily at ambient or elevated temperatures.

The organic thiophosphoric acid has the general formula

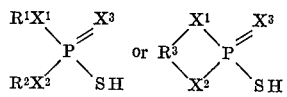

in which $R^1$ and $R^2$ are monovalent hydrogen- and carbon-containing groups, $R^3$ is a divalent hydrogen- and carbon-containing group $X^1$, $X^2$, and $X^3$ are oxygen or sulphur, sulphur being preferred for $X^3$ and oxygen being preferred for $X^1$ and $X^2$. The groups $R^1$ and $R^2$ are usually, but need not necessarily be, the same. The groups $R^1$ and $R^2$ can be aliphatic or aromatic, e.g. they may be the hydrocarbyl groups such as alkyl, aryl, alkaryl, or aralkyl. If alkyl the groups $R^1$ and $R^2$ preferably contain between one and 25 carbon atoms. Suitable aryl groups include phenyl, naphthyl, and anthranyl. Suitable alkaryl groups are alkyl phenyl, the alkyl portion being $C_1$ to $C_{18}$, e.g. tolyl, xylyl, nonyl phenyl, dodecyl phenyl, octadecyl phenyl, dibutyl phenyl, butyl pentyl phenyl and dinonyl phenyl. Aralkyl groups which are suitable include benzyl, 2-phenyl butyl, and 2-phenyl ethyl.

As an alternative to being hydrocarbyl, the groups $R^1$ and $R^2$ may contain oxygen atoms, e.g. they may be alkoxylalkyl, for instance methoxybutyl, or alkoxyaryl, e.g. ethoxyphenyl, or aryloxyalkyl, e.g. phenoxyethyl.

The divalent group $R^3$ may be aromatic or aliphatic. Thus, it may be for example phenylene, bisphenylene or their alkylated derivatives in which case the thiphosphate is derived from catechol, resorcinol, bisphenol or their alkylated derivatives or their thio analogues.

Alternatively, the divalent group $R^3$ can be a group represented by the formula

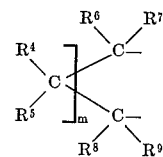

where $R^4$, $R^5$, $R^6$, $R^7$, $R^8$ and $R^9$ are hydrogen or hydrogen- and carbon-containing groups, and $m$ is zero (in which case the two carbon atoms linked to the groups $R^6$, $R^7$, $R^8$ and $R^9$ are themselves linked directly together) or an integer, $m$ preferably being zero or an integer of from 1 to 6. The thiophosphoric acids of this type are thus derived from diols or dithiols wherein the carbon atoms bearing — OH and/or — SH groups are contiguous or separated by $m$ carbon atoms. Preferably the groups $R^4$ to $R^9$ inclusive contain only carbon and hydrogen atoms, i.e., they are hydrocarbyl groups, e.g. alkyl, aryl, alkaryl, aralkyl alicyclic or alkenyl groups. These groups $R^4$ to $R^9$ preferably contain one to six carbon atoms e.g. methyl or ethyl. Particularly suitable diols from which the thiophosphoric acids are derived are 2-methyl pentane-2,4,-diol; butane-2,3 diol; 2 ethyl hexane-1,3-diol; hexane 1,6-diol and 2,2-diethyl propane-1,3-diol.

The hydrogen- and carbon- containing groups $R^1$, $R^2$, and $R^3$ are preferably hydrocarbyl groups, i.e., contain no atoms other than carbon and hydrogen. If desired however these groups $R^1$, $R^2$ and $R^3$ may also be substituted by polar substituents, e.g. chloro, bromo, keto, ethereal, aldehydo or nitro atoms or groups. Preferably these polar substituents are not present in proportions sufficiently large to alter significantly the hydrocarbon character of the group, e.g. they contain no more than 10% by weight of polar substituent based on the hydrocarbyl portion of the group.

The preferred thio phosphoric acids are the dithiophosphoric acids, i.e., ones where $X^1$ and $X^2$ are oxygen and $X^3$ is sulphur.

The hydrogen peroxide which is used is preferably an aqueous solution of hydrogen peroxide. The concentration of hydrogen peroxide in the aqueous solution is preferably 5 to 50 wt % e.g. about 35 wt %.

The preferred method of reacting the thiophosphoric acid and hydrogen peroxide is to add the acid to the peroxide, and in this preferred method the acid is generally added slowly with stirring, e.g. over 1 to 3 hours, to the hydrogen peroxide. After allowing the final reaction mixture to stand for a while e.g. from 2 to 6 hours, the desired phosphorothionyl disulphide can be obtained by distillation of the reaction mixture to remove water, and filtration where necessary to remove haze or solids.

In the alternative method of reacting the thiophosphoric acid with the hydrogen peroxide the acid and peroxide are introduced into the reaction vessel so that there is never more than 10 mole % excess of acid in the reaction vessel. Preferably the rates of introduction are such that there is always at least an excess (compared with thiophosphoric acid) of the peroxide. This excess can be between 2 and 30 mole % e.g. about 5 mole % excess. By raising the temperature of the reaction medium and/or reducing the pressure water of reaction can be removed continuously as it is formed.

In carrying out this invention it is preferred that the reaction be carried out in the presence of a non-polar diluent, by which term we mean a diluent in which water is substantially insoluble. This will ensure minimum contact between water and the unreacted thiophosphoric acid thus minimising the possibilities of hydrolysis of the acid.

Examples of non-polar diluents are the paraffinic or aromatic hydrocarbons, e.g. hexane, octane, cetane, decane, benzene, toluene, xylenes, petroleum ethers, cyclohexane, and mineral oils. Also suitable are halogenated hydrocarbons, e.g. chloroform, chlorobenzene, carbon tetrachloride and trichlorethylene.

It is possible however to use a polar solvent such as acetic acid which would form a homogenous reaction mixture leading to more rapid oxidation.

In order to prevent any hydrolysis taking place during the reaction it is desirable that the reaction temperature should not be allowed to rise above 75° C. at normal pressure, and preferably not above 60° C., e.g. a maximum temperature in the range of 50° to 60° C.

The disulphides prepared by the process of this invention are very suitable as antioxidants, antiwear and the extreme pressure additives for lubricating oils. Also they are suitable as fuel oil additives.

Suitable lubricating oils include animal, vegetable or mineral oils, for example petroleum oil fractions ranging from spindle oil to SAE 30, 40 or 50 lubricating oil grades; castor oil, fish oils, oxidised mineral oil or brightstocks. The lubricant may be a synthetic ester oil, e.g. diesters such as those prepared by esterfying carboxylic acids such as adipic or sebacic acid with monohydric alcohols, or complex esters obtained by the esterification of a polyhydric alcohol (e.g. a polyglycol) with a dibasic acid (e.g. sebacic or adipic acid) and a monohydric alcohol (e.g. 2-ethyl hexanol or a $C_8$ oxo alcohol).

The preferred quantity of phosphorothionyl disulphide added to the lubricating oil is a minor proportion by weight such as between 0.01 and 10%, e.g. between 0.1 and 5% by weight, based on the total weight of the oil plus disulphide.

Suitable fuel oils to which the disulphides may be added as an antioxidant include liquid hydrocarbon fuel oils, for example a petroleum distillate fuel oil boiling above 200° C and including light fuel oils, gas oils used as fuel for diesel fuels and residual fuels. Also they may be added to gasolines as pre-ignition preventives.

The preferred quantity of phosphorothionyl sulphide added to the fuel oil is a minor proportion by weight such as between 0.001 and 5% by weight, e.g. between 0.005% and 0.5% by weight based on the total weight of the fuel oil composition.

Other additives, for example detergents (e.g. calcium sulphonates) or V.I. improvers (e.g. vinyl acetate/furmarate copolymers) may be added to the lubricating oil or fuel oil.

The phosphorothionyl disulphide can also be used as an antioxidant for plastics e.g. polypropylenes.

EXAMPLE 1

2,120g of a mixture of $C_7$, $C_8$ and $C_9$ alkyl phenols and 444g of phosphorus pentasulphide were heated to 120°–130° C for 2 hours to give the corresponding dithiophosphoric acid (SAN = 80 mg KOH/g).

400g of this dithiophosphoric acid was added slowly over 2 hours to a stirred suspension of 29g of 35% aqueous hydrogen peroxide. The temperature rose to 55°–60° C. the mixture was then allowed to stand for 3 hours, and stripped over 2 hours (90° C/40 mm Hg) to give a brown liquid product with an SAN = 0.9 mg KOH/g.

EXAMPLE 2

800g of the dithiophosphoric acid prepared in Example 1 and 73g of 35% aqueous hydrogen peroxide were added over 4½ hours to 200g. of a well stirred paraffinic basestock. The rates of addition were such as to maintain a small excess of peroxide (5 mole %) at all times. The reaction mixture was maintained at 70° C/200 mm Hg absolute so that the water of reaction was instantly removed. A clear brown product having an SAN = 0.9 mg KOH/g was obtained.

COMPARATIVE TEST 200g of the dithiophosphoric acid as prepared in Example 1 were dissolved in 50g of a paraffinic basestock, and 13.7g of 35% aqueous hydrogen peroxide were added slowly with stirring such that the temperature was maintained at 40°–50° C. The mixture was allowed to stand 3 hours and then stripped and filtered to give a brown product with SAN = 38 mg KOH/g. Since this product had a high acid number the advantage of using the process of this invention can be clearly seen.

What is claimed is:

1. A process for the preparation of a phosphorothionyl disulfide wherein an organic thiophosphoric acid is reacted with an aqueous solution of hydrogen peroxide in a reactor, under conditions such that said thiophosphoric acid concentration in said reactor does not exceed 10 mole % of the hydrogen peroxide concentration in said reactor, said conditions being obtained either by the slow addition of said thiophosphoric acid to said reactor already containing said aqueous solution of hydrogen peroxide, or by separately adding said thiophosphoric acid and said aqueous solution of hydrogen peroxide to said reactor while controlling the relative amounts of said acid and peroxide being added such that there is less than 10 molar % excess of said acid in said reactor relative to said peroxide in said reactor, said organic thiophosphoric acid being selected from the group consisting of acids of the formula:

(a)
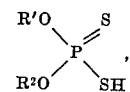

and (b)
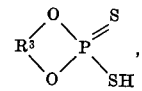

wherein $R^1$ and $R^2$ are selected from the group consisting of $C_1$ to $C_{25}$ alkyl groups, and alkyl phenyl groups wherein the alkyl portion is a $C_1$ to $C_{18}$ alkyl group and $R^3$ is derived from a diol selected from the group consisting of 2-methyl pentane-2,4-diol, butane-2,3-diol, 2-ethyl hexane-1,3-diol, hexane-1,6-diol and 2,2-diethyl propane-1,3-diol.

2. A process according to claim 1, wherein said thiophosphoric acid has the formula:

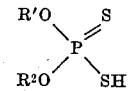

wherein $R^1$ and $R^2$ are alkyl phenyl groups.

3. A process according to claim 2, wherein said alkyl groups of said alkyl phenyl are $C_7$ to $C_9$ alkyl groups.

4. A process according to claim 2, wherein said thiophosphoric acid and hydrogen peroxide are introduced into the reactor under conditions so that there is always during the reaction 2 to 30 mole % excess of the hydrogen peroxide in the reactor relative to the dithiophosphoric acid.

5. A process according to claim 4 which is carried out in the presence of a non-polar diluent, wherein the reaction temperature is not allowed to rise above 60° C., and wherein said aqueous solution contains 5 to 50 wt. % hydrogen peroxide.

6. A process according to claim 4 wherein the thiophosphoric acid is slowly added to hydrogen peroxide already in the reactor.

7. A process according to claim 4 wherein the thiophosphoric acid and hydrogen peroxide are simultaneously added to the reactor.

* * * * *